US 6,396,663 B1

(12) United States Patent
Kasamatsu

(10) Patent No.: US 6,396,663 B1
(45) Date of Patent: May 28, 2002

(54) HEAD SLIDER AND RECORDING DISK DRIVE

(75) Inventor: Yoshiharu Kasamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/511,998

(22) Filed: Feb. 24, 2000

(30) Foreign Application Priority Data

Mar. 15, 1999 (JP) .......................................... 11-068056

(51) Int. Cl.[7] .............................. G11B 5/60; G11B 5/187
(52) U.S. Cl. ................................ 360/235.8; 360/235.7; 360/236.5; 360/236.6
(58) Field of Search ........................... 360/235.7, 235.8, 360/236.5, 236.6

(56) References Cited

U.S. PATENT DOCUMENTS

| | | | | |
|---|---|---|---|---|
| 5,010,429 A | * | 4/1991 | Taguchi et al. | 360/103 |
| 5,028,852 A | * | 7/1991 | Dunfield | 318/254 |
| 5,079,652 A | | 1/1992 | Ishida et al. | 360/75 |
| 5,162,073 A | * | 11/1992 | Aronoff et al. | 156/625 |
| 5,285,337 A | * | 2/1994 | Best et al. | 360/97.02 |
| 5,708,540 A | * | 1/1998 | Ananth et al. | 360/103 |
| 5,768,055 A | * | 6/1998 | Tian et al. | 360/103 |
| 5,815,346 A | * | 9/1998 | Kimmal et al. | 360/103 |
| 5,841,608 A | * | 11/1998 | Kasamatsu et al. | 360/103 |
| 5,991,118 A | * | 11/1999 | Kasamatsu et al. | 360/103 |
| 6,297,932 B1 | * | 10/2001 | Liu | 360/235.8 |

FOREIGN PATENT DOCUMENTS

| | | | | |
|---|---|---|---|---|
| EP | 644534 A1 | * | 3/1995 | G11B/5/60 |
| JP | 1317289 | | 12/1989 | |
| JP | 7065342 | | 3/1995 | |
| JP | 8212740 | | 8/1996 | |
| JP | 9245451 | | 9/1997 | |
| JP | 9293223 | | 11/1997 | |
| JP | 10-247368 | * | 9/1998 | G11B/21/21 |
| JP | 10-011931 | * | 1/1999 | G11B/21/21 |
| WO | WO 99/00792 A3 | * | 1/1999 | G11B/5/60 |

* cited by examiner

Primary Examiner—Mark R. Powell
Assistant Examiner—Jeffrey Allen Rossi
(74) Attorney, Agent, or Firm—Greer, Burns & Crain, Ltd.

(57) ABSTRACT

A projection serves to space the air bearing surface apart from the surface of a recording disk when the recording disk stands still. The contact area can be reduced between a flying head slider and the surface of the recording disk. When the flying head slider inclines downstream around the tip end of the projection in response to a reverse rotation of the recording disk at the beginning of the rotation, the flying head slider allows a rugged surface to contact the surface of the recording disk at the outflow end thereof. The effect of meniscus or adsorption cannot be intensified between the lubricating agent or oil and the air bearing surface, namely, the flying head slider. Accordingly, it is possible to reliably avoid failure in starting the recording disk to rotate. Less torque of the spindle motor allows the recording disk to normally start rotating.

11 Claims, 8 Drawing Sheets

HEAD SLIDER AND RECORDING DISK DRIVE

BACKGROUND OF THE INVENTION

1. Field of the Invention

The present invention relates to a head slider employed in a recording disk drive such as a hard disk drive (HDD), and in particular, to a head slider comprising an air bearing surface formed on a slider body and a projection defining a tip end higher than the air bearing surface.

2. Description of the Prior Art

A flying head slider is well known in the field of a magnetic disk drive such as an HDD. The head slider flies above the surface of a magnetic disk by receiving airflow generated along the surface when the magnetic disk is driven to rotate. Such a flying head slider usually touches the surface of the magnetic disk when the magnetic disk stands still. It is known as a so-called contact start stop (CSS) control. A head slider suffers from adsorption of a lubricating agent or oil spread over the surface of the disk in the CSS. The adsorption tends to hinder rotation of the magnetic disk at the beginning of the rotation.

It is proposed to form projections or adsorption prevention pads on a flying head slider at the air bearing surface which is opposed to the surface of the magnetic disk. The pads serve to prevent the air bearing surface from contacting the surface of the magnetic disk when the magnetic disk stands still, so that the flying head slider may reduce its contact area to the surface of the disk. This allows less adsorption of a lubricating agent or oil to act on the flying head slider.

It is a trend in the field of magnetic disk drives to employ a so-called Hall-less motor as a spindle motor for driving the magnetic disk. No Hall element is employed in the Hall-less motor. The Hall-less motor thus controls the amount of rotation for the rotor without monitoring or detecting the rotational angle or position of the rotor. The Hall-less motor sometimes suffers from a reverse rotation of the rotation axis when the rotor starts to rotate.

The aforementioned flying head slider takes an inclined attitude during flight, making the outflow end closer to the surface of the magnetic disk. Accordingly, it is necessary to position the projections far from the outflow end or trailing edge of the slider body so as to prevent collision between the projections and the magnetic disk during the flight. Such disposition of the projections causes inclination of the slider body about the tip ends of the projections when the magnetic disk makes a reverse rotation at the beginning of the rotation. The inclination causes the slider body to contact the surface of the magnetic disk at the outflow end in addition to the projections. The effect of meniscus between the slider body and the magnetic disk is intensified so that a larger adsorption is caused between the slider body and the magnetic disk. The magnetic disk sometimes cannot even start to rotate in this situation, because a recent spindle motor transmits less torque to the magnetic disk.

SUMMARY OF THE INVENTION

It is accordingly an object of the present invention to provide a head slider allowing a recording disk to normally start to rotate even when a spindle motor causes a reverse rotation.

According to a first aspect of the present invention, there is provided a head slider comprising: a slider body having a leading edge and a trailing edge; a rail formed on the slider body and extending to the trailing edge; a projection formed on the rail; and a rugged surface formed on the rail near the trailing edge.

With the above-described structure, the slider body may be supported on the surface of a recording disk with the projection when the recording disk stands still. The surface of the rail may be spaced apart from the surface of the recording disk. The rail is prevented from contacting the recording disk. The contact area can be reduced between the head slider and the surface of the recording disk. Less adsorption may be transmitted to the head slider from a lubricating agent or oil spread over the surface of the recording disk.

When the head slider inclines downstream around the tip end of the projection in response to a reverse rotation of the recording disk at the beginning of the rotation, the head slider allows the rugged surface to contact the surface of the recording disk at the trailing or outflow end thereof. The effect of meniscus or adsorption cannot be intensified between the lubricating agent or oil and the slider body. Accordingly, it is possible to reliably avoid failure in starting the recording disk to rotate. Less torque of the spindle motor allows the recording disk to normally start rotating.

The rugged surface of the rail may be formed by a higher surface roughness. The rugged surface is in this case made rougher than the remaining surface of the rail. A higher surface roughness is adapted to reduce the contact area between the head slider and the surface of the recording disk. Otherwise, the rugged surface may include at least a stripe of groove carved on the rail, or at least a stripe of swell formed on the rail. The rugged surface likewise serves to reduce the contact area between the head slider and the surface of the recording disk. The groove may extend across the rail in the lateral direction of the head slider.

According to a second aspect of the present invention, there is provided a head slider comprising: a slider body having a leading edge and a trailing edge; a pair of rails formed on the slider body and extending from the leading edge to the trailing edge; a pair of front projections formed on the rails near the leading edge, respectively; a pair of rear projections formed on the rails at a predetermined distance from the trailing edge, respectively; and a pair of rugged surfaces formed on the rails near the trailing edge, respectively.

The head slider of this type is in general designed to define a passage for airflow between the rails. If the passage is formed to expand in the direction of airflow, it is possible to generate a negative pressure between the slider body and the surface of a rotating recording disk. When the negative pressure is balanced with a positive pressure or lift generated at the surfaces of the rails, namely, air bearing surfaces, the flying height of the head slider can reliably be fixed at the predetermined level during rotation of the recording disk.

On the other hand, when the recording disk stands still, the slider body may be supported on the surface of a recording disk with the projections. Accordingly, less adsorption may be transmitted to the head slider from a lubricating agent or oil spread over the surface of the recording disk in the aforementioned manner. In addition, even when the head slider inclines downstream around the tip end of the projection in response to a reverse rotation of the recording disk at the beginning of the rotation, the effect of meniscus or adsorption cannot be intensified between the lubricating agent or oil and the slider body. It is possible to reliably avoid failure in starting the recording disk to rotate. Less torque of the spindle motor allows the recording disk to normally start rotating.

The rugged surfaces of the respective rails may take any shape, such as a higher roughness, at least a stripe of groove, at least a stripe of swell, in the aforementioned manner.

According to a third aspect of the present invention, there is provided a head slider comprising: a slider body having a leading edge and a trailing edge; a front rail formed on the slider body near the leading edge; a pair of rear rails formed on the slider body and extending to the trailing edge; a front projection formed on the front rail near the leading edge; a pair of rear projections formed on the rear rails at a predetermined distance from the trailing edge, respectively; and a pair of rugged surfaces formed on the rails near the trailing edge, respectively.

The head slider of this type is in general designed to define a passage for airflow behind the front rail between the rear rails. The front rail serves to vertically expand the passage in the direction of airflow. It is possible to generate a larger negative pressure between the slider body and the surface of a rotating recording disk. When the negative pressure is balanced with a larger positive pressure or lift generated at the surfaces of the rails, namely, air bearing surfaces, the flying height of the head slider can further reliably be fixed at the predetermined level during rotation of the recording disk.

On the other hand, when the recording disk stands. still, the slider body may be supported on the surface of a recording disk with the projections. Accordingly, less adsorption may be transmitted to the head slider from a lubricating agent or oil spread over the surface of the recording disk in the aforementioned manner. In addition, even when the head slider inclines downstream around the tip end of the projection in response to a reverse rotation of the recording disk at the beginning of the rotation, the effect of meniscus or adsorption cannot be intensified between the lubricating agent or oil and the slider body. It is possible to reliably avoid failure in starting the recording disk to rotate. Less torque of the spindle motor allows the recording disk to normally start rotating.

The rugged surfaces of the respective rails may take any shape, such as a higher roughness, at least a stripe of groove, at least a stripe of swell, in the aforementioned manner.

Aforementioned head sliders may be employed in a recording disk drive such as a hard disk drive and other magnetic disk drive. Such recording disk drive may further comprise: a recording disk having a plurality of recording tracks; a Hall-less motor connected to the recording disk for rotation; a carriage arm carrying the head slider; and an actuator driving the carriage arm. In addition, a transducer may be formed on the slider body for reproducing and/or recording data from and/or into the recording disk. dr

DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
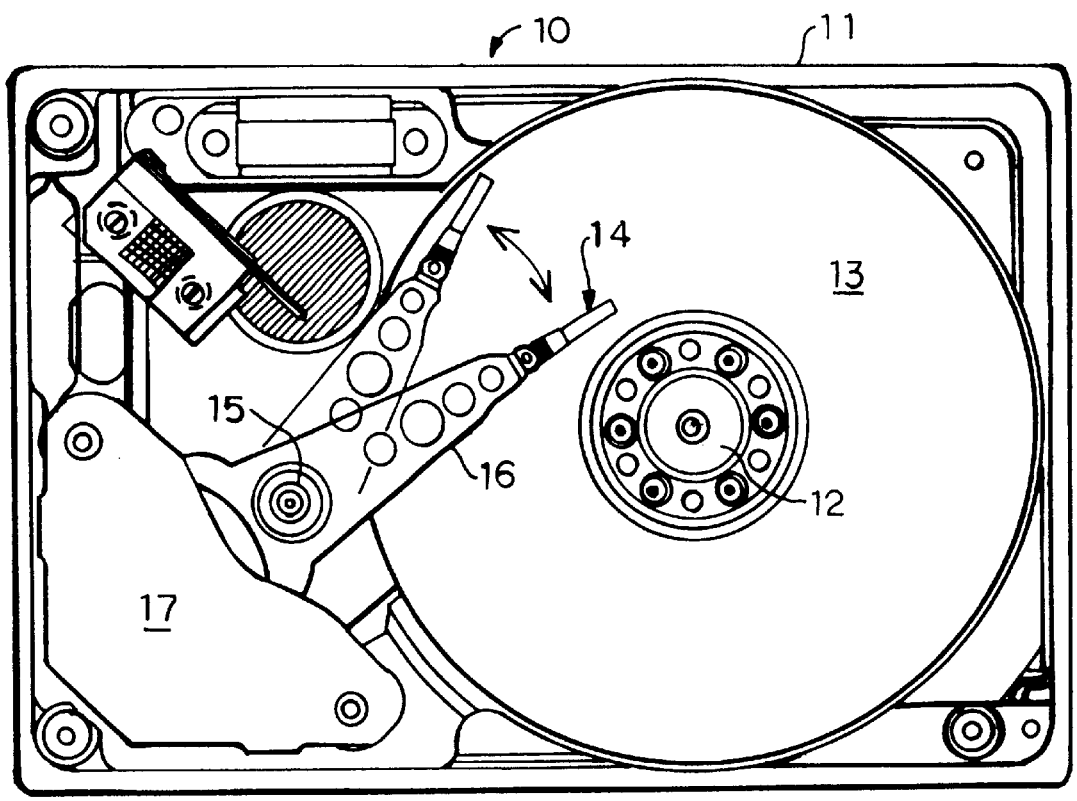
FIG. 1 is a plan view schematically illustrating an interior structure of a hard disk drive (HDD)

FIG. 1 illustrates an interior structure of a hard disk drive (HDD) 10 as an example of a recording disk drive. The enclosure 11 of the HDD 10 incorporates a magnetic disk 13 as a recording disk of the present invention, mounted on a spindle motor 12, and a flying head slider 14 opposed to the magnetic disk 13. The spindle motor 12 serves to drive the magnetic disk 13 for rotation about a rotation axis. A Hall-less motor is, for example, selected as the spindle motor 12. A Hall-less motor is a DC brushless motor employing no Hall element.

The flying head slider 14 is fixed at the tip end of a carriage arm 16 capable of swinging about a support axis 15. When information is written into or read out of the magnetic disk 13, the carriage arm 16 is driven to swing with the assistance of the power from an actuator 17 comprising a magnetic circuit, for example, so that the flying head slider 14 moves in the radial direction of the magnetic disk 13. Such radial movement allows the flying head slider 14 to be positioned above a target recording track on the surface of the magnetic disk 13. The interior space of the enclosure 11 may be closed with a cover, not shown.

Figure 2:
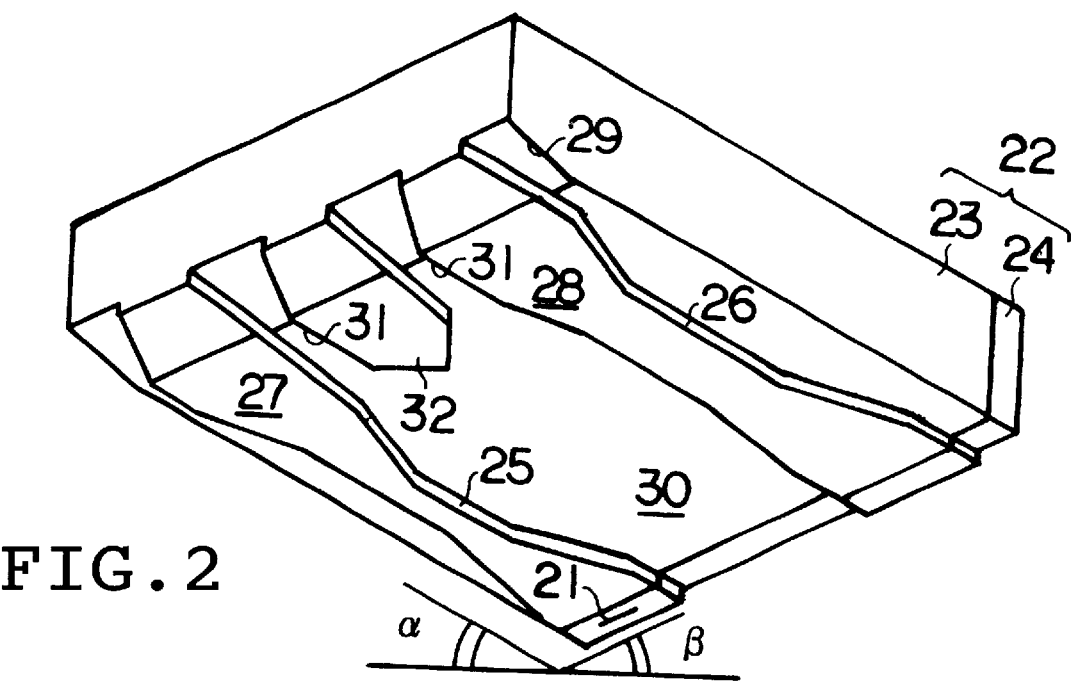
FIG. 2 is an enlarged perspective view illustrating a flying head slider.

FIG. 2 schematically illustrates the flying head slider 14. The flying head slider 14 comprises a slider body 22 which exposes a head element or transducer element 21 at the bottom surface opposed to the magnetic disk 13. The slider body 22 includes an $Al_2O_3$—TiC body 23 and an $Al_2O_3$ layer 24 overlaid at the outflow or trailing end of the $Al_2O_3$—TiC body 23. The bottom surface extends 2 mm by 1.6 mm, for example.

First and second rails 25, 26 are formed on the slider body 22 to extend from the inflow end or leading edge to the outflow end or trailing edge. A first air bearing surface 27 is defined on the top surface of the first rail 25 for generating a lift by receiving airflow along the surface of the rotating magnetic disk 13. A second air bearing surface 28 is likewise defined on the top surface of the second rail 26 for generating a lift in the same manner. The aforementioned transducer element 21 is embedded in the first air bearing surface 27 on the $Al_2O_3$ layer 24.

A tapered leading edge 29 at the inflow end allows a larger lift to act on the flying head slider 14 at the upstream side than at the downstream side. Accordingly, the flying head slider 14 keeps an inclined attitude by a pitch angle α during flight. "Pitch angle α" may be referred to as an inclination angle along the longitudinal direction of the slider body 22 or in the direction of the airflow. Moreover, lift generated at the second air bearing surface 28 is set larger than that at the first air bearing surface 27. Accordingly, the slider body 22 keeps an inclined attitude by a roll angle β during flight. "Roll angle β" may be referred to as an inclination angle along the lateral direction of the slider body 22 or in the perpendicular direction to the airflow. A combination of the pitch angle α and the roll angle β serves to minimize the distance between the slider body 22 and the surface of the magnetic disk 13 around the transducer element 21.

A passage 30 is defined between the first and second rails 25, 26 to allow airflow to pass through during rotation of the magnetic disk 13. A third rail 32 is formed at the entrance of the passage 30 so as to define narrow initial passages 31 between the first and second rails 25, 26. Airflow is adapted to expand in the lateral direction of the slider body 22 right after having passed through the narrow initial passage 31, so as to generate a negative pressure in the passage 30. Such negative pressure is balanced with lift generated at the first and second air bearing surfaces 27, 28, so that the flying height of the flying head slider 14 can be fixed at the predetermined level during rotation of the magnetic disk 13.

Figure 3:
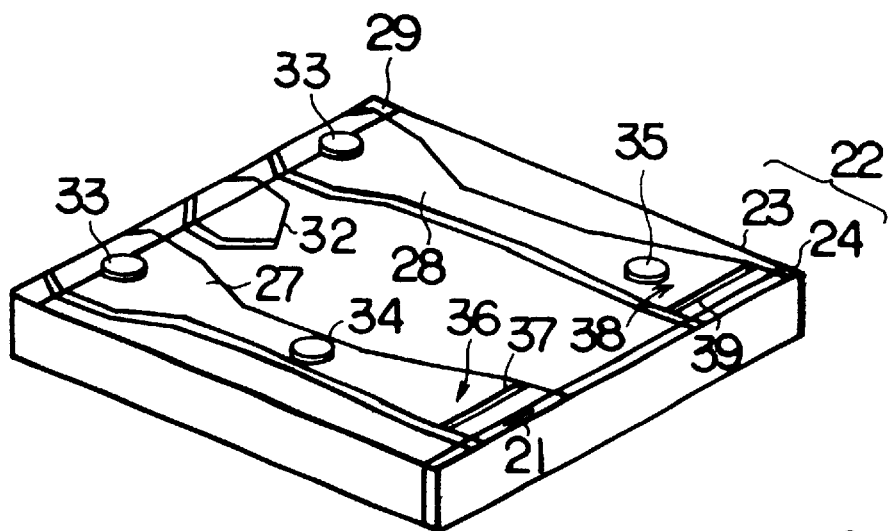
FIG. 3 is an enlarged perspective view illustrating a bottom surface of the flying head slider.

As is apparent from FIG. 3, the flying head slider 14 comprises a pair of projections or front adsorption prevention pads 33 standing on the first and second air bearing surfaces 27, 28, at the boundary of the tapered leading edge 29, and a pair of projections or first and second rear adsorption prevention pads 34, 35 standing on the first and second air bearing surfaces 27, 28 downstream of the front adsorption prevention pads 33, respectively. When the magnetic disk 13 stands still, the slider body 22 is supported above the surface of the magnetic disk 13 with four adsorption prevention pads 33, 34, 35 because the tip ends of the adsorption prevention pads 33, 34, 35 reach a level higher than the first and second air bearing surfaces 27, 28. The first and second air bearing surfaces 27, 28 are prevented from contacting the surface of the magnetic disk 13, so that the slider body 22 may receive an adsorption from a lubricating agent or oil, spread over the surface of the magnetic disk 13, only via the adsorption prevention pads 33, 34, 35.

The front adsorption prevention pads 33 are located near or closest to the inflow end or leading edge of the slider body 22. However, as is apparent from FIG. 3, the front adsorption prevention pads 33 are located off the tapered leading edge 29. On the other hand, the first and second rear adsorption prevention pads 34, 35 are located far, at predetermined distances, from the outflow end or trailing edge of the slider body 22. Such disposition of the rear adsorption prevention pads 34, 35 allows the transducer element 21 to approach the magnetic disk 13 to the utmost, while preventing collision between the rear adsorption prevention pads 34, 35 and the surface of the magnetic disk 13, even when the slider body 22 keeps the inclined attitude by a pitch angle α in the aforementioned manner. In addition, the first rear adsorption prevention pad 34 is shifted toward the inflow end as compared with the second rear adsorption prevention pad 35. Accordingly, even when the slider body 22 keeps the inclined attitude by a roll angle β in the aforementioned manner, it is possible to achieve the closest approach of the transducer element 21 to the magnetic disk 13 while preventing collision between the first rear adsorption prevention pad 34 and the surface of the magnetic disk 13.

Figure 4:
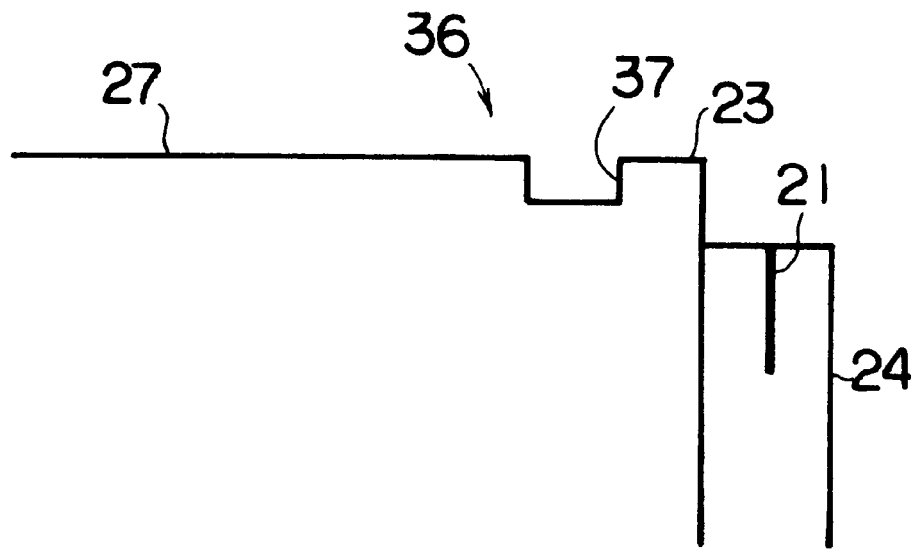
FIG. 4 is an enlarged partial sectional view taken along the line 4—4 in FIG. 3.

A first rugged surface 36 is formed on the first air bearing surface 27 downstream of the first rear adsorption prevention pad 34 near the trailing edge of the slider body 22. The first rugged surface 36 comprises, as shown in FIG. 4, for example, a stripe of groove 37 carved on the first air bearing surface 27 to extend in the lateral direction of the slider body 22. A second rugged surface 38 is likewise formed on the second air bearing surface 28 downstream of the second rear adsorption prevention pad 35. The second rugged surface likewise comprises a stripe of groove 39 carved on the second air bearing surface 28 to extend in the lateral direction of the slider body 22. The respective grooves 37, 39 are positioned 100 μm or less upstream of the outflow end of the Al$_2$O$_3$—TiC body 23, for example. The rugged surfaces 36, 38 serve to reduce the contact area between the slider body 22 and the surface of the magnetic disk 13 even when the magnetic disk 13 suffers from a reverse rotation which causes the outflow end of the slider body 22 to contact the magnetic disk 13, as described later in detail. In addition, the grooves 37, 39 of width equal to or larger than 10 μm, in particular in a range between 10–100 μm, may serve to restrain the effect of meniscus acting between the slider body 22 and the lubricating agent or oil spread over the surface of the magnetic disk 13, even when the slider body 22 contacts the magnetic disk 13 at the outflow end. The depth of the grooves 37, 39 can be set equal to or larger than 5 nm, preferably at 5–10 nm, for example.

Figure 5:
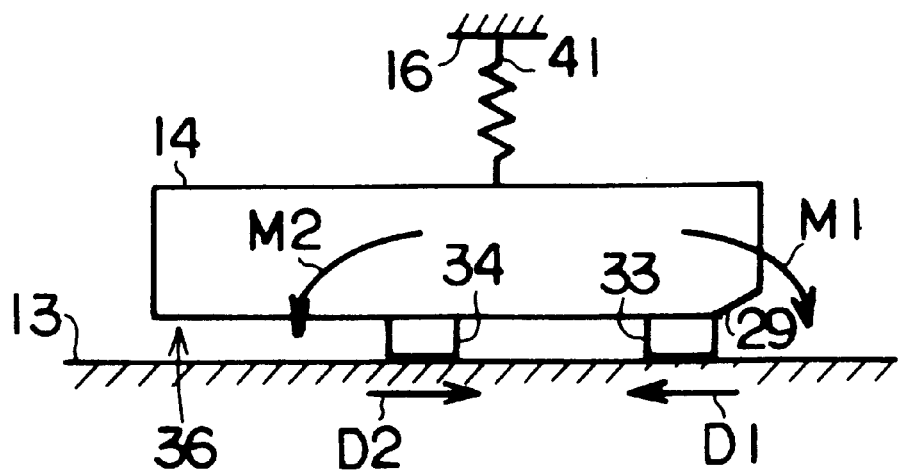
FIG. 5 schematically illustrates a behavior of the flying head slider when the magnetic disk starts to rotate.

Assume that the magnetic disk 13 stands still. The flying head slider 14 touches the surface of the magnetic disk 13 as shown in FIG. 5. When the HDD 10 receives instructions for writing or reading data into or out of the magnetic disk 13, the spindle motor 12 drives the magnetic disk 13 for rotation. Airflow is generated along the surface of the magnetic disk 13 in response to the rotation of the magnetic disk 13. The airflow acts upon the first and second air bearing surfaces 27, 28 to generate a lift of the flying head slider 14. The lift allows the flying head slider 14 to fly above the surface of the magnetic disk 13. The flying head slider 14 opposes the transducer element 21 to the surface of the magnetic disk 13 during flight so as to allow the transducer element 21 to achieve the writing or reading operation.

In general, the flying head slider 14 is supported at the tip end of the carriage arm 16 via a resilient suspension 41. The rigid carriage arm 16 is adapted to regulate the movement of the flying head slider 14, while the resilient suspension 41 allows the slight movement of the flying head slider 14. When the magnetic disk 13 starts to rotate, the disk surface below the front adsorption prevention pads 33 moves in the normal direction D1 so that a moment M1 around the tip ends of the front adsorption prevention pads 33 acts on the flying head slider 14. Such moment M1 tries to incline the flying head slider 14 about the tip ends of the front adsorption prevention pads 33. However, the flying head slider 14 hardly inclines upstream irrespective of the moment M1, since the front adsorption prevention pads 33 are located at the inflow end of the slider body 22. Even if the flying head slider 14 slightly inclines upstream making the inflow end closer to the magnetic disk 13, the tapered leading edge 29 serves to prevent the flying head slider 14 to contact the magnetic disk 13 at the front or inflow end in addition to the adsorption prevention pads 33, 34, 35.

A spindle motor hardly induces a reverse rotation of the rotation axis, namely, a magnetic disk, because the spindle motor employs Hall elements to control the rotation of the rotor. The Hall elements are used to detect the rotational position or angle of the rotor or rotation axis. The rotation of the rotor can be precisely controlled based on the detected rotational position or angle. When the magnetic disk is expected to start rotating, the relative position can be detected between the magnets of the rotor and the coils of the stator in the spindle motor. Electric current is supplied to the coils in response to the detection, so that it is possible to reliably prevent a reverse rotation of the rotor.

Recently, it is proposed to employ a so-called Hall-less motor, in place of the aforementioned spindle motor, in the HDD 10 so as to achieve the reduction in size of a spindle motor by omitting Hall elements. The Hall-less motor is adapted to supply electric current to the coils of the stator at the beginning of the rotation of the rotor without detecting the relative position between the magnets of the rotor and the coils of the stator. Some of the relative positions cause a reverse rotation of the rotor. The Hall-less motor cannot completely restrain a reverse rotation of the rotor.

If the magnetic disk 13 suffers from a reverse rotation at the beginning of the normal rotation, the surface below the first and second rear adsorption prevention pads 34, 35 moves in the abnormal or reverse direction D2, as shown in FIG. 5. Such movement of the surface generates a moment M2 around the tip ends of the first and second rear adsorption prevention pads 34, 35 in the direction opposite to the moment M1. The moment M2 easily causes the flying head slider 14 to incline downstream about the tip ends of the first and second rear adsorption prevention pads 34, 35, because the first and second rear adsorption prevention pads 34, 35 are positioned far from the outflow end of the slider body 22, as described above. The inclination causes the slider body 22 to contact the surface of the magnetic disk 13 at the outflow end.

According to the flying head slider 14 of the present invention, the first and second rugged surfaces 36, 38 serve to reduce the contact area between the slider body 22 and the surface of the magnetic disk 13 even when the slider body 22 touches the surface of the magnetic disk 13 at the outflow end at the reverse rotation of the disk 13. The adsorption or effect of meniscus is not intensified between the slider body 22 and the magnetic disk 13. It is accordingly possible to reliably avoid failure in starting the magnetic disk 13 to rotate. Less torque of the spindle motor allows the magnetic disk 13 to normally start rotating. Without the first and second rugged surfaces 36, 38, failure in rotation of the magnetic disk 13 has been observed in response to the increase in the adsorption or effect of meniscus between the slider body 22 and the magnetic disk 13.

Next, the description will briefly be made on producing the aforementioned flying head slider 14. First of all, a plurality of transducer elements are formed on the surface of an $Al_2O_3$ layer overlaid all over the surface of a wafer made of $Al_2O_3$—TiC. Each transducer element is located within a block which is to be cut off into a single flying head slider 14. For example, 100×100=10,000 flying head sliders 14 in total may be taken out of the single wafer of 5 inches diameter. The transducer elements are thereafter covered with a protection layer of $Al_2O_3$. Rows of the aforementioned blocks are then cut off from the wafer into wafer bars, respectively. The exposed surface of the wafer bar is shaped into the bottom of the flying head slider 14. Finally, each block is cut off from the wafer bar into a flying head slider 14.

Figure 6A:
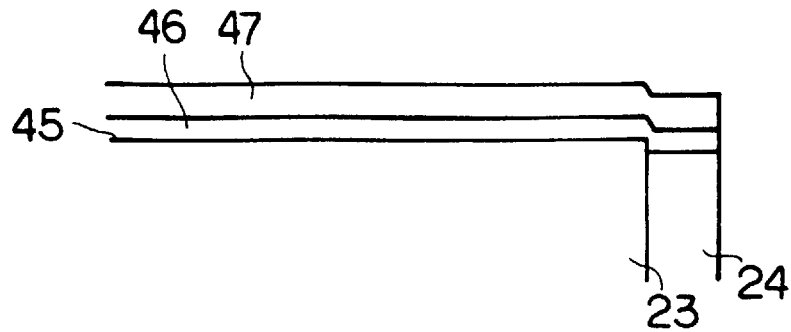
FIGS. 6A to 6E are enlarged sectional views partly illustrating a first rail during production of the flying head slider.

In shaping the bottom of the flying head slider 14, as shown in FIG. 6A, a first diamond-like-carbon (DLC) layer 46 of approximately 5 nm thickness is formed on the exposed surface 45 of the wafer bar by a sputtering method or the like. The first DLC layer 46 is overlaid on an Si or SiC adsorption layer of approximately 2 nm thickness covered over the exposed surface 45. Such adsorption layer may be formed by a sputtering method, for example. The first DLC layer 46 functions as a protection layer for protecting the surfaces of the first and second rails 25, 26. A second DLC layer 47 is overlaid on the surface of the first DLC layer 46.

Figure 6B:
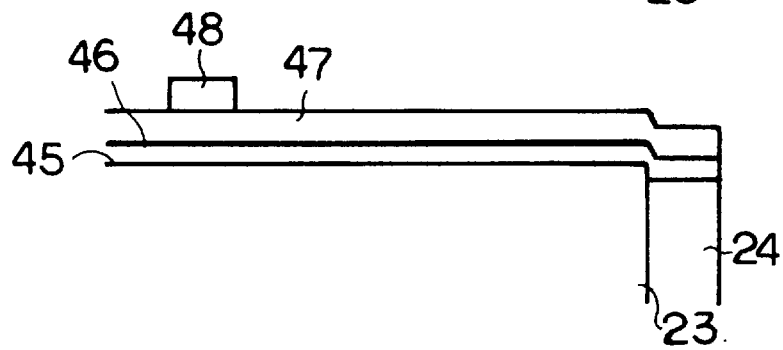
Figure 6C:
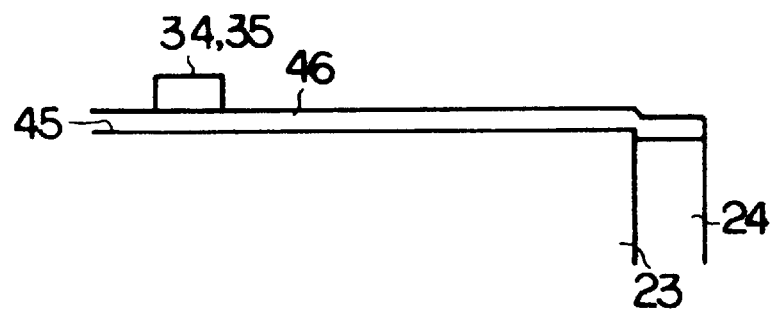

As shown in FIG. 6B, a resist pattern 48 is formed on the second DLC layer 47 for defining contours of adsorption prevention pads 33, 34, 35. The resist pattern 48 may be formed of a filmresist or photoresist, for example. When the second DLC layer 47 is subjected to an etching process, using $O_2$ plasma, for example, the second DLC layer 47 is carved into the adsorption prevention pads 33, 34, 35 so as to expose the first DLC layer 46, as shown in FIG. 6C.

Figure 6D:
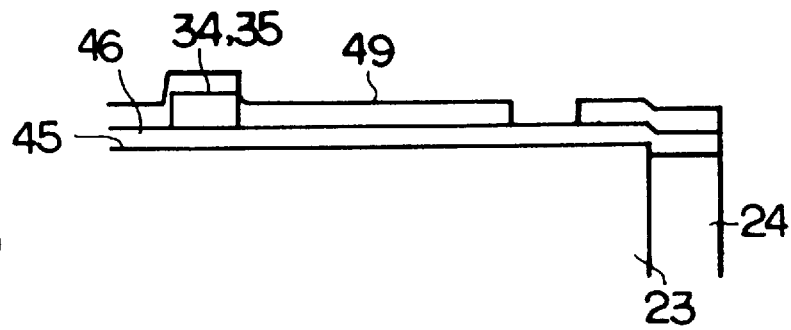
Figure 6E:
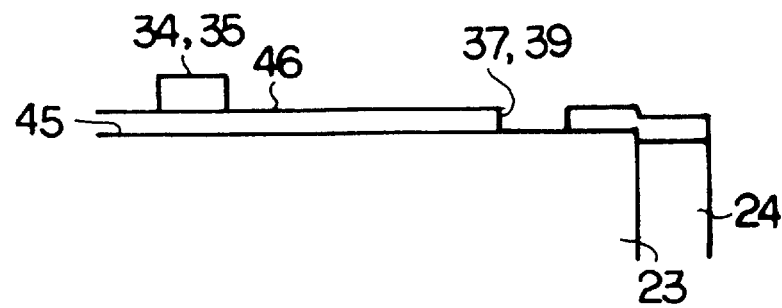

Thereafter, a resist pattern 49 is formed on the first DLC layer 46 for defining contours of the grooves 37, 39 of the first and second rugged surfaces 36, 38, as shown in FIG. 6D. The resist pattern 49 can be formed of a filmresist or photoresist, for example. The resist pattern 49 is adapted to cover the adsorption prevention pads 33, 34, 35 carved out of the second DLC layer 47. The first DLC layer 46 is then subjected to an etching process using $O_2$ plasma or the like, with the adsorption layer subjected to an etching process using $CF_4$ plasma or the like. The grooves 37, 39, of approximately 7 nm depth, for example, are consequently carved as shown in FIG. 6E.

Furthermore, a resist pattern, not shown, is formed on the exposed surface 45 for defining contours of the first, second and third rails 25, 26, 32. When the exposed surface 45 is subjected to a dry etching method or the like, the wafer bar of $Al_2O_3$—TiC and the $Al_2O_3$ layer are carved into the bottom surface of the flying head slider 14. The front and first rear adsorption prevention pads 33, 34 and the first rugged surface 36 are maintained on the first rail 25, while the front and second rear adsorption prevention pads 33, 35 and the second rugged surface 38 are maintained on the second rail 26. It should be noted that the grooves 37, 39 can be formed by using an ion milling process or the like for cutting out not only the first DLC layer 46 but also the wafer of $Al_2O_3$—TiC.

Figure 7:
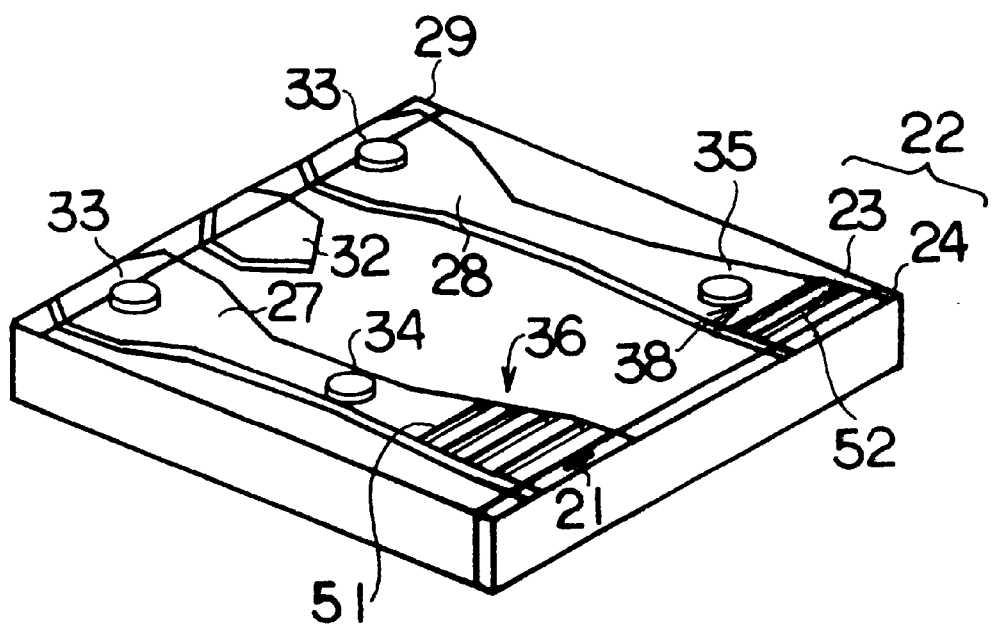
FIG. 7 is an enlarged perspective view illustrating the flying head slider comprising first and second rugged surfaces according to another embodiment.
Figure 8:
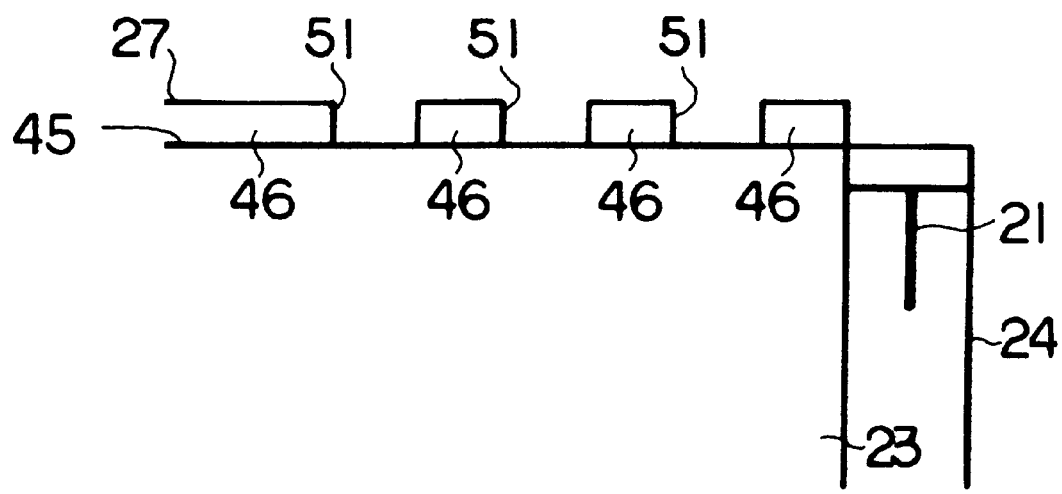
FIG. 8 is an enlarged sectional view partly illustrating the first rail comprising stripes of grooves on the first rugged surface.
Figure 9:
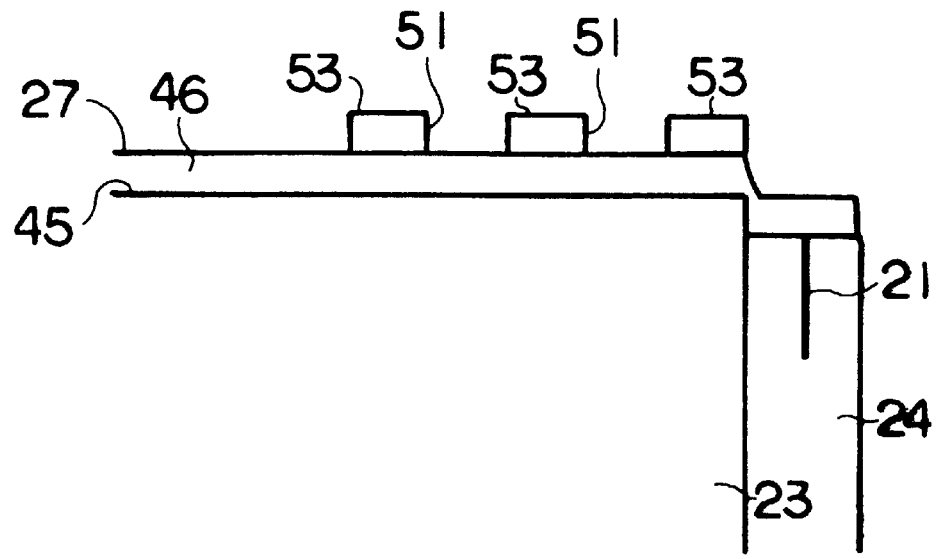
FIG. 9 is an enlarged sectional view partly illustrating the first rail comprising stripes of ridges for forming the grooves on the first rugged surface.

The first and second rugged surfaces 36, 38 may comprise, as shown in FIG. 7, stripes of grooves 51, 52 extending side by side in the lateral direction of the slider body 22. The grooves 51, 52 can be formed, as shown in FIG. 8, for example, by cutting out the first DLC layer 46 to expose the surface of the $Al_2O_3$—TiC body 23. The grooves 51, 52 may have a width of approximately 5 $\mu$m and a depth of approximately 5 nm, for example. The adjacent grooves 51, 52 may be spaced from each other by approximately 10 $\mu$m, for example. Otherwise, the grooves 51, 52 can be formed, as shown in FIG. 9, for example, by stripes of ridges 53 which are carved on the first DLC layer 46 using a lift-off process. However, the tops of the ridges 53 should stay within a higher level than the adsorption prevention pads 33, 34, 35, when the flying head slider 14 opposes its bottom surface to the surface of the magnetic disk 13. The ridges 53 may have a width of approximately 5 $\mu$m and a depth of approximately 5 nm, for example. The adjacent ridges 53 may be spaced from each other by approximately 10 $\mu$m, for example.

Figure 10:
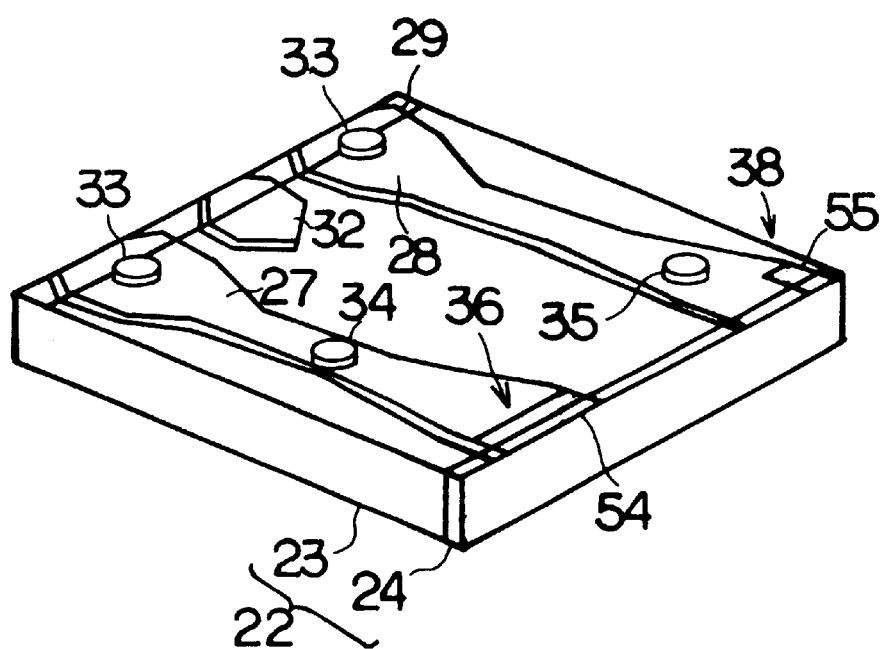
FIG. 10 is an enlarged perspective view illustrating the flying head slider comprising first and second rugged surfaces according to a further embodiment.
Figure 11:
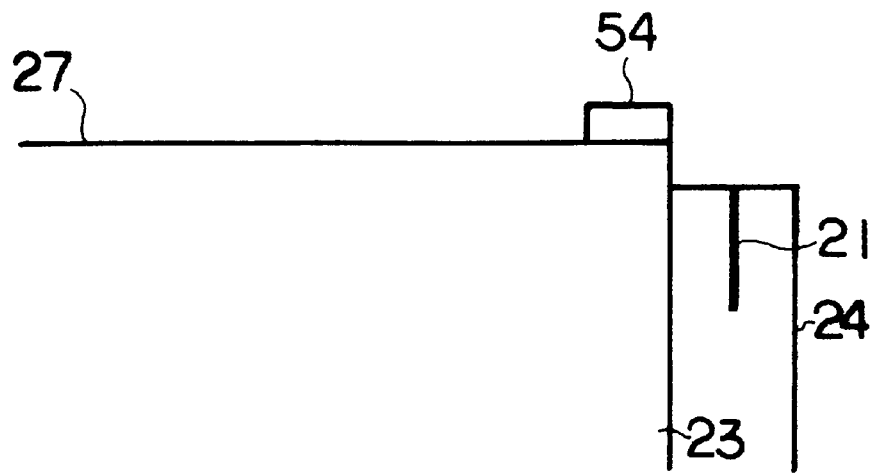
FIG. 11 is an enlarged sectional view partly illustrating the first rail comprising a stripe of swelling surface on the first rugged surface.

In addition, the rugged surfaces 36, 38 may comprise, as shown in FIGS. 10 and 11, a stripe of swelling surface 54, 55 extending on the first or second air bearing surface 27, 28 in the lateral direction of the slider body 22. The swelling surfaces 54, 55 may be formed by removing the first DLC layer 46 spread over the first and second air bearing surfaces 27, 28 except the areas near the outflow end. However, it is preferable to keep the first DLC or protection layer 46 around the transducer element 21, because the protection layer may prevent the transducer element 21 from corrosion. Further, the swelling surface 55 may not extend completely across the second air bearing surface 28 in the lateral direction of the slider body 22, as is apparent from FIG. 10. The swelling surface 55 is only required to cover the area which contacts the surface of the magnetic disk 13 when the slider body 22 inclines downstream. Accordingly, the area of the swelling surface 55 can be reduced at the second air bearing surface 28 where no transducer element is embedded.

Figure 12:
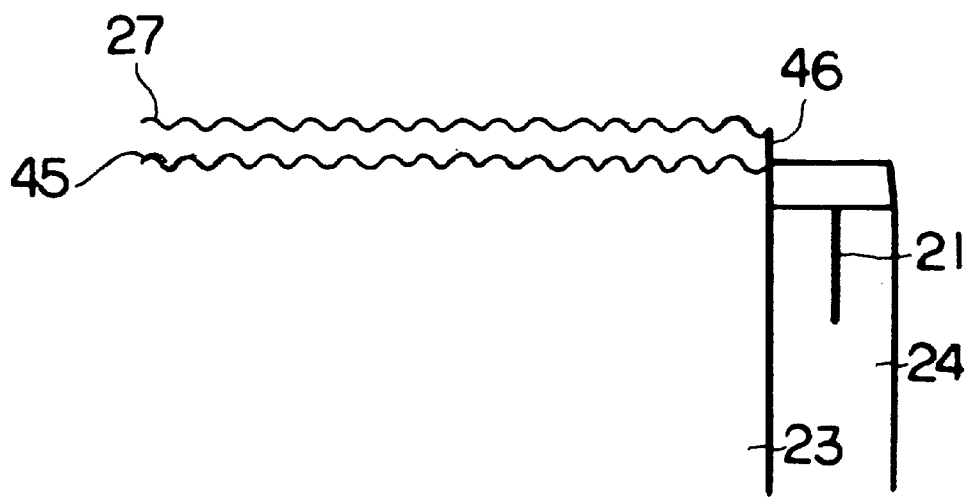
FIG. 12 is an enlarged sectional view partly illustrating the first rail comprising the first rugged surface made of surface roughness.

Furthermore, the first and second rugged surfaces 36, 38 may, as shown in FIG. 12, be made of a surface roughness of the first and second air bearing surfaces 27, 28. The surface roughness may be formed by lapping the exposed surface 45 which has been defined when the wafer bar is cut off from the wafer. When the first DLC or protection layer 46 covers over the surface of the $Al_2O_3$—TiC body 23, the surface of the first DLC or protection layer 46 reflects the surface roughness formed on the surface of the $Al_2O_3$—TiC body 23. The surface roughness accordingly appears on the first and second air bearing surfaces 27, 28. However, the surface roughness may not be formed all over the first and second air bearing surfaces 27, 28. The surface roughness is only required to cover the areas downstream of the first and second rear adsorption prevention pads 34, 35, respectively. The surface roughness is approximately set at Ra=10 nm, for example.

Figure 13:
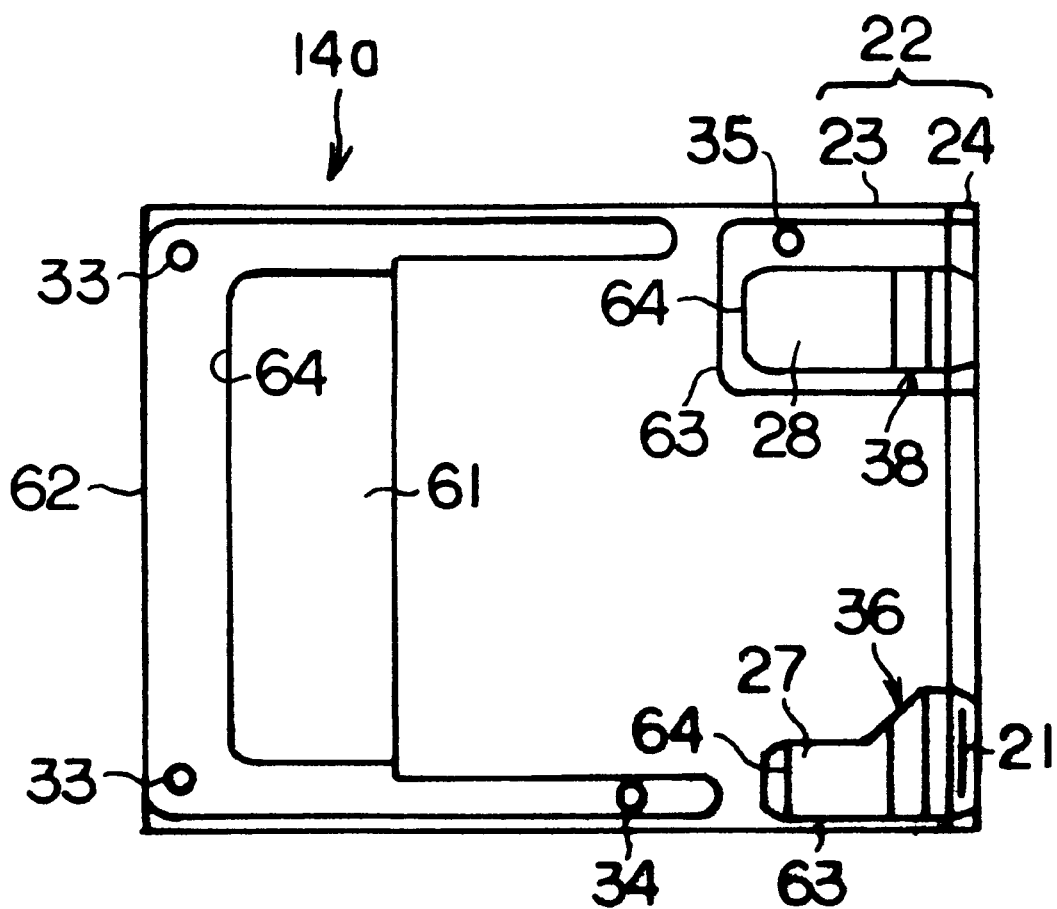
FIG. 13 is an enlarged plan view illustrating the bottom surface of a flying head slider according to another embodiment.

Furthermore, the first and second rugged surfaces 36, 38 may be formed, as shown in FIG. 13, on the flying head slider 14a comprising a front air bearing surface 61, in addition to the first and second air bearing surfaces 27, 28, for generating a lift. The flying head slider 14a of this type comprises a front rail 62 extending in the lateral direction of the slider body 22 near the inflow end, and a pair of rear rails 63 arranged side by side in the lateral direction near the outflow end. The rear rails 63 are spaced apart from each other for defining a passage for airflow. The first and second air bearing surfaces 27, 28 are defined on the top surfaces of the rear rails 63, respectively. According to the flying head slider 14a of this type, steps 64 defined upstream of the front air bearing surface 61 and the first and second air bearing surfaces 27, 28 serve to generate a larger lift or positive pressure by receiving airflow. On the other hand, a larger negative pressure can be generated in response to expansion of airflow in the direction vertical to the surface of the magnetic disk 13 behind the front rail 61. The balance between the larger lift and the larger negative pressure serves to stabilize the behavior of the flying head slider 14a.

It should be noted that the aforementioned second rugged surface 38 can be omitted from the second air bearing surface 28 in the respective above-described embodiments.

What is claimed is:

1. A head slider comprising:
   a slider body having a leading edge and a trailing edge;
   a front rail formed on the slider body near the leading edge;
   a pair of rear rails formed on the slider body and extending to the trailing edge;
   a front projection formed on the front rail near the leading edge;
   a pair of rear projections formed on the rear rails at a predetermined distance from the trailing edge, respectively; and
   a pair of rugged surfaces formed on the rails near the trailing edge, respectively, said rugged surfaces including a stripe of groove carved on the rails, respectively.

2. The head slider according to claim 1 wherein the grooves extend across the rail, respectively.

3. A head slider comprising:
   a slider body having a leading edge and a trailing edge;
   a rail formed on the slider body and extending toward the trailing edge;
   an air bearing surface defined on a top surface of the rail;
   a projection formed on the rail so as to stand on the air bearing surface; and
   a rougher surface area defined on the air bearing surface downstream of the projection, said rougher surface area being rougher than a remaining portion of the air bearing surface.

4. A head slider comprising:
   a slider body having a leading edge and a trailing edge;
   a pair of rails formed on the slider body and extending from the leading edge toward the trailing edge;
   a pair of air bearing surfaces defined on top surfaces of the rails, respectively;
   a pair of front projections formed on the rails near the leading edge so as to stand on the air bearing surfaces, respectively;
   a pair of rear projections formed on the rails at a predetermined distance from the trailing edge so as to stand on the air bearing surfaces, respectively; and
   a pair of rougher surface areas defined on the air bearing surfaces downstream of the rear projections, respectively, said rougher surface areas being rougher than remaining portions of the air bearing surfaces.

5. A recording disk drive comprising:
   a recording disk having a plurality of recording tracks;
   a Hall-less motor connected to the recording disk for rotation;
   a head slider;
   a carriage arm carrying the head slider; and
   an actuator driving the carriage arm, wherein the head slider includes:
      a slider body having a leading edge and a trailing edge;
      a rail formed on the slider body and extending toward the trailing edge;
      an air bearing surface defined on a top surface of the rail;
      a projection formed on the rail so as to stand on the air bearing surface;
      a rougher surface area defined on the air bearing surface downstream of the projection, said rougher surface area being rougher than a remaining portion of the air bearing surface; and
      a transducer formed on the slider body for reproducing and/or recording data from and/or into the recording disk.

6. A head slider comprising:
   a slider body having a leading edge and a trailing edge;
   a rail formed on the slider body and extending toward the trailing edge;
   an air bearing surface defined on a top surface of the rail;
   a projection formed on the rail so as to stand on the air bearing surface; and
   at least a stripe of groove carved on the air bearing surface downstream of the projection.

7. The head slider according to claim 6, wherein the groove extends across the rail.

8. A head slider comprising:
   a slider body having a leading edge and a trailing edge;
   a pair of rails formed on the slider body and extending from the leading edge toward the trailing edge;
   a pair of air bearing surfaces defined on top surfaces of the rails, respectively;
   a pair of front projections formed on the rails near the leading edge so as to stand on the air bearing surfaces, respectively;
   a pair of rear projections formed on the rails at a predetermined distance from the trailing edge so as to stand on the air bearing surfaces, respectively; and
   at least a pair of stripes of groove carved on the air bearing surfaces downstream of the rear projections.

9. The head slider according to claim 8, wherein the grooves extend across the corresponding rails, respectively.

10. A recording disk drive comprising:
    a recording disk having a plurality of recording tracks;
    a Hall-less motor connected to the recording disk for rotation;
    a head slider;
    a carriage arm carrying the head slider; and
    an actuator driving the carriage arm, wherein the head slider comprises:
        a slider body having a leading edge and a trailing edge;
        a rail formed on the slider body and extending toward the trailing edge;
        an air bearing surface defined on a top surface of the rail;
        a projection formed on the rail so as to stand on the air bearing surface;
        at least a stripe of groove carved on the air bearing surface downstream of the projection; and
        a transducer formed on the slider body for reproducing and/or recording data from and/or into the recording disk.

11. The recording disk drive according to claim 10, wherein the groove extends across the rail.

* * * * *